(12) United States Patent
Lewis et al.

(10) Patent No.: US 11,537,183 B2
(45) Date of Patent: Dec. 27, 2022

(54) ENERGY OFFLOADING SYSTEM

(71) Applicant: DRONE ENERGY IP HOLDINGS LLC, Amherst, NY (US)

(72) Inventors: Ralph W. Lewis, Amherst, NY (US); Jacob Gadikian, Amherst, NY (US); Christopher Abramo, Amherst, NY (US)

(73) Assignee: Drone Energy IP Holdings, LLC, Ameherst, NY (US)

( * ) Notice: Subject to any disclaimer, the term of this patent is extended or adjusted under 35 U.S.C. 154(b) by 0 days.

(21) Appl. No.: 17/536,307

(22) Filed: Nov. 29, 2021

(65) Prior Publication Data

US 2022/0317745 A1 Oct. 6, 2022

Related U.S. Application Data

(63) Continuation of application No. 16/475,019, filed as application No. PCT/US2018/050468 on Sep. 11, 2018, now abandoned.

(60) Provisional application No. 62/556,880, filed on Sep. 11, 2017.

(51) Int. Cl.
*G06F 1/30* (2006.01)
*G06F 1/20* (2006.01)
*G06F 1/3293* (2019.01)
*H02J 3/28* (2006.01)
*H02J 3/24* (2006.01)
*H02J 3/38* (2006.01)

(52) U.S. Cl.
CPC ............... *G06F 1/20* (2013.01); *G06F 1/203* (2013.01); *G06F 1/206* (2013.01); *G06F 1/30* (2013.01); *G06F 1/3293* (2013.01); *H02J 3/24* (2013.01); *H02J 3/28* (2013.01); *H02J 3/381* (2013.01); *H02J 2300/20* (2020.01)

(58) Field of Classification Search
CPC . G06F 1/20; G06F 1/203; G06F 1/206; G06F 1/30; G06F 1/3293; H02J 2300/20; H02J 3/24; H02J 3/28; H02J 3/381; H02J 9/04
See application file for complete search history.

(56) References Cited

U.S. PATENT DOCUMENTS

| | | | | |
|---|---|---|---|---|
| 2002/0013689 A1* | 1/2002 | Hunton | ............ | H02J 3/008 703/18 |
| 2006/0186669 A1* | 8/2006 | Ruggieri | ............ | F22B 21/26 290/2 |
| 2012/0038210 A1* | 2/2012 | Kibbee | ............ | B60L 53/51 320/101 |
| 2016/0334824 A1* | 11/2016 | Forbes, Jr. | ............ | G05B 15/02 |

* cited by examiner

*Primary Examiner* — Kidest Bahta
(74) *Attorney, Agent, or Firm* — Merchant & Gould PC

(57) ABSTRACT

An energy offloading system is in direct electric communication with an energy generating system and dynamically receives energy from the energy generating system. The energy offloading system uses energy for high-load computations. The energy offloading system includes computers performing the high-load computations as well as servers, cooling units, and communication devices. When the energy from the energy generating system is terminated, the energy offloading system may power down these and other devices, or may switch these devices to an alternative power source. The energy offloading system may be portable.

14 Claims, 11 Drawing Sheets

ENERGY OFFLOADING SYSTEM

This application is a continuation of and claims priority to U.S. patent application Ser. No. 16/475,019, filed Jun. 28, 2019, which application is a National Stage Application of PCT/US2018/050468, filed Sep. 11, 2018, which claims the benefit of U.S. Provisional patent application Ser. No. 62/556,880, filed Sep. 11, 2017, the entire disclosures of which incorporated by reference in their entireties. To the extent appropriate, a claim of priority is made to each of the above disclosed applications.

Energy generation systems, such as nuclear power plants, coal plants, wind turbines, solar energy plants, biological energy recover systems, gas wells, natural gas, and co-general energy plants, and the like, convert and/or capture energy and transform the energy into electrical energy. These and other energy generation systems struggle with matching the timing of energy supply with the timing of the demand for energy supply. For example, some energy systems require a minimum energy demand to economically maintain energy generation. Others experience oscillations between high levels of energy production and no energy production. Still others have no viable way of offloading excess energy, as they may not be connected to a large interconnected network for delivering electricity.

Accordingly, it remains desirous for the energy generation industry to access technology that will allow energy generation systems to dynamically divert energy to mitigate minimum start-up and operational requirements, smooth energy production oscillations, and/or use energy from isolated energy generation systems.

It is with respect to these and other considerations that embodiments have been made. Also, although relatively specific problems have been discussed, it should be understood that the embodiments should not be limited to solving the specific problems identified herein.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Aspects of the technology include an energy offloading system that is in direct electric communication with an energy generating system. The energy offloading system may dynamically receive energy from the energy generating system. The energy offloading system uses, in examples, the energy for high-load computations. The energy offloading system includes computers executing computations as well as servers, cooling units, and communication devices. The devices of energy offloading system may be housed in a portable container, which container may be located proximate to an energy generating system. When the energy from the energy generating system is terminated, the energy offloading system may power down these and other devices, or may switch these devices to an alternative power source. In other aspects, termination of the energy results in an abrupt shutoff of the various devices in an energy offloading system. In aspects, the energy offloading system is in a portable container capable of being located proximate (e.g., within several feet or up to a mile) to an energy generation system.

The following example clauses are examples of the technology described herein.

Clause 1. A system comprising: at least one computer that directly draws energy, using a first electric transmission line, from an energy generation station, wherein the energy generation station provides energy to an electric grid; at least one cooling mechanism for cooling the at least one computer; and at least one network communication device connected to the at least one computer; wherein the first electric transmission line is not part of the electric grid.

Clause 2. The system of Clause 1, wherein the at least one computer is running a high-computational load program.

Clause 3. The system of Clause 1 or 2, wherein the at least one computer is performing a method, the method comprising: receiving, from the energy generation station, an indication that the energy draw will be terminated; changing the power source of the at least one cooling mechanism from the energy generation station to an alternative energy source; and powering down at least one device.

Clause 4. The system of Clause 1, 2, or 3, wherein the at least one computer receives data, the data comprising at least one selected from the group consisting of: an energy transmission termination alert, an energy transmission initiation alert, a present load status, and a predicted load status.

Clause 5. The system of Clause 4, wherein the at least one computer enters into a shutdown that saves a state of a computational device associated with the computer after receiving the energy transmission termination alert, and further wherein the shutdown does not include powering down the cooling mechanism.

Clause 6. The system of Clause 4 wherein the indication is a termination of energy delivery via the first electric transmission line.

Clause 7. The system of Clause 5 wherein the system includes a buffer storing data to be transmitted via the network communication device and the graceful shutdown includes transmitting the data in the buffer before powering down the network communication device.

Clause 8. The system of Clause 3 wherein the system further comprises: an energy storage device within the housing; and the alternative energy source is the energy storage device.

Clause 9. The system of Clause 1 further comprising: a housing cooled by the at least one cooling mechanism; and wherein the at least one cooling unit, a CPU, a data rack, and an energy management device are contained within the housing.

Clause 10. The system of Clause 1 wherein the system is portable.

Clause 11. A computer-implemented method to manage a termination of energy received directly from an energy generation station, the method comprising: receiving, from the energy generation station, an indication that energy from the energy generation station will be terminated; as a result of receiving the indication: changing the power source of a cooling unit from the energy generation station to an alternative energy supply; and powering down at least one computer.

Clause 12. The computer-implemented method of Clause 11, wherein the indication is termination of energy.

Clause 13. The computer-implemented method of Clause 11 or 12, wherein the result of receiving the indication further comprises: saving a state of a computer program of the at least one computer.

Clause 14. The computer-implemented method of Clause 13, wherein the result of receiving the indication further comprises: determining that the computation state of the at least one computer should be saved prior to saving the state of the computer program of the at least one computer.

Clause 15. The computer-implemented method of Clause 11, 12, 13 or 14, wherein the result of receiving the indication further comprises: changing the power source of the at least one computer from the energy generation station to the alternative energy supply.

Clause 16. The computer-implemented method of Clause 11, 12, 13, 14 or 15, wherein the result of receiving the indication further comprises: transmitting a completed calculation.

Clause 17. The computer implemented method of Clause 16, wherein transmitting is performed using a mobile network.

Clause 18. The computer-implemented method of Clause 11, 12, 13, 14, 15, 16, or 17 further comprising: processing a program related to at least one of data mining, graphic rendering, machine learning, cryptocurrency mining, blockchain validation, distributed ledger processing, and/or distributed computation.

Clause 19. The computer-implemented method of Clause 11, wherein the indication is an indication of a predicated load status of the energy generation station, the predicted load status including a predicted date and time that that energy from the energy generation station will be terminated.

Clause 20. A power plant energy offloading system comprising: an environment having a substantially enclosed space; at least one computer disposed within the substantially enclosed space receiving, directly, energy from the power plant; at least one cooling unit controlling the environment; and a network communication device, wherein the network communicate device is electronically coupled to the at least one computer.

Clause 21. The power plant energy offloading system of Clause 20, wherein the enclosed space is defined by at least one wall coupled to a floor and a ceiling.

Clause 22. The power plant energy offloading system of Clause 20 or 21, wherein the enclosed space has a volume of about 1169, 2385, or 2660 cubic feet.

Clause 23. The power plant energy offloading system or Clause 20, 21, or 22, further comprising a universal power supply that delivers energy to the cooling unit when the delivery of energy from the power plant to the at least one computer ceases.

Clause 24. A method of managing the electrical demand of an energy generating system comprising: identifying a minimum load to operate the energy generating system; determining that demand for electrical energy is insufficient to meet the load; and delivering electrical energy to an energy offloading system to meet the load requirement.

Clause 25. The method Clause 24, wherein the electrical energy delivered to the energy offloading system is calculated by determining the difference between the demand for electrical energy and the minimum load.

Clause 26. The method of Clause 24 or 25, wherein the energy offloading system comprises a portable unit that includes at least one computer, a cooling unit, a storage unit, and communications devices.

Clause 27. The power plant energy offloading system of Clause 26, wherein the network communication device is in electronic communication with the power plant and receives information related to a time when the at least one computer will cease receiving energy directly from the power plant.

DETAILED DESCRIPTION

Figure 1:
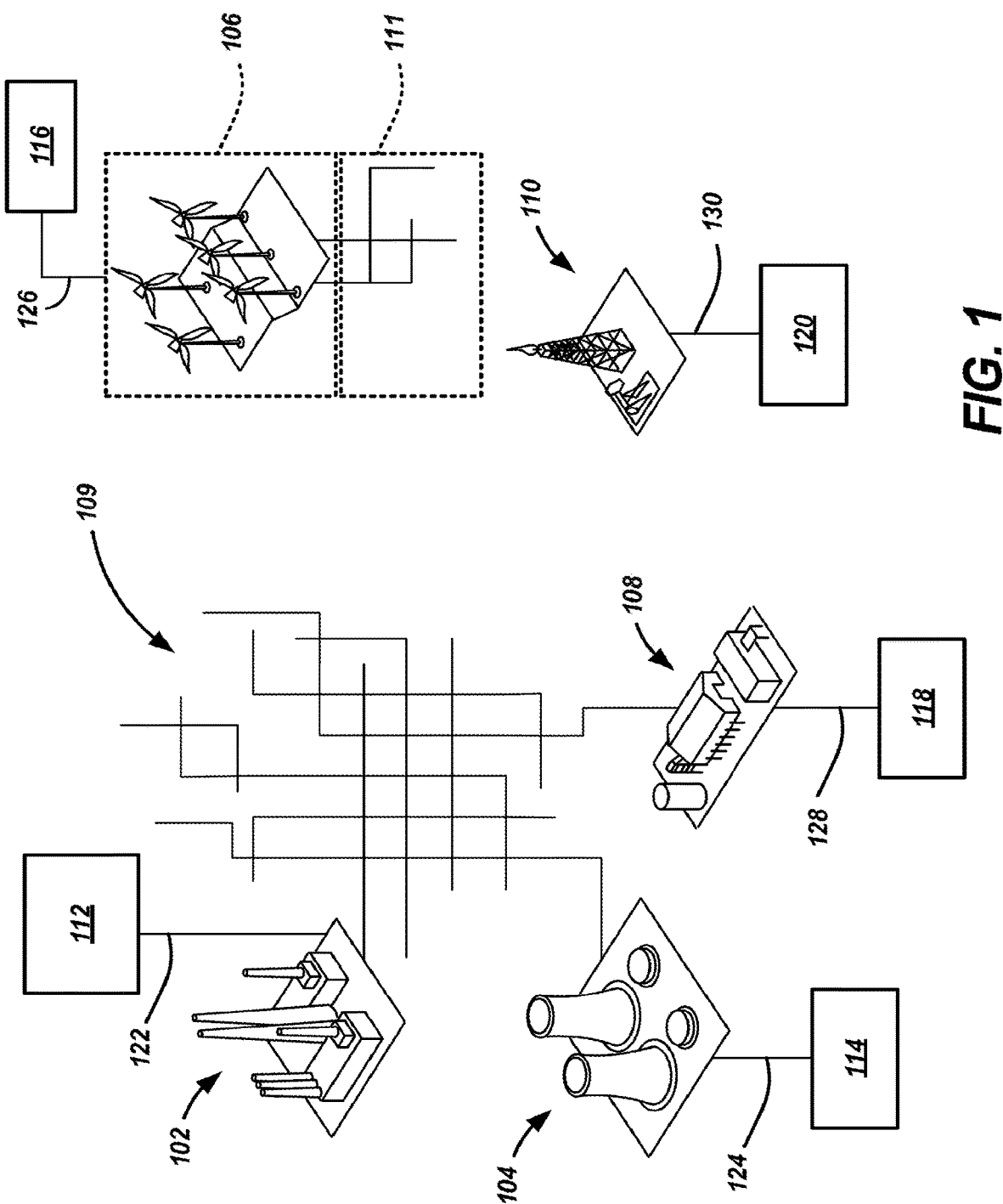
FIG. 1 is an example environment in which the energy offloading technology may be employed.

FIG. 1 is an example environment 100 in which the energy offloading technology may be employed. As illustrated, FIG. 1 includes multiple examples of energy generating systems (e.g., power plants). This includes a coal power plant 102, a nuclear power plant 104, a wind energy farm 106, and a biological energy recover system 108. As illustrated, each of the coal power plant 102, the nuclear power plant 104, and the biological energy recover system 108 provide power to an electrical grid 109. In other examples, an energy generating system may provide localized energy to a local grid, such as local grid 111. As illustrated, the wind energy farm 106 provides energy to a localized energy grid 111. In other examples, such as the natural gas well 110, the energy generating system produces energy as a by-product of operating the well. This by product may be captured using a variety of devices and converted into electrical energy.

Each of the power generating systems are coupled to an energy offloading system. An energy offloading system draws energy from one or more energy generating systems. In aspects of the technology, the energy offloading system draws energy dynamically. That is, the energy offloading system may change quickly from drawing energy to not drawing energy (i.e., dynamic power cycling of the energy offloading system). Dynamic power cycling allows the energy offloading system to draw energy when it is advantageous to do so but shut down or switch to an alternative energy source when it is not advantageous to continue drawing energy from the energy offloading system, in some instances. Advantages may relate to smoothing the demand curve and/or matching the demand of energy consumption with the generation of energy. An additional advantage may include using an energy offloading system to convert unused energy of an energy generating system for economic activity.

Aspects of the technology include energy offloading systems (such as the illustrated first energy offloading system 112, second energy offloading system 114, third energy offloading system 116, fourth energy offloading system 118, and fifth energy offloading system 120) drawing energy to power various subcomponents of the energy offloading system such as computers, servers (e.g., data racks), associated hardware, cooling units, and communications systems. The computers may use the energy provided by an energy generation system to execute high-load computations. The hardware may store various information associated with the computations and programs running on the computers. The energy offloading systems may further communicate the results of the computations to another computer via a network, such as the internet. This may be accomplished using a communications systems of the energy offloading system.

The computers, hardware, and communications devices may be disposed within a portable container that defines an environment. The portable environment may comprise a shipping container, such as 20 foot container (having a volume of around 1169 $ft^2$), a 40 foot container (having a volume of around 2385 $ft^2$), or a 40 foot high cube (having a volume of around 2660 $ft^2$). Other portable containers may be adapted to be an energy offloading system.

Cooling units may control the environment. In some aspects, the energy offloading systems include an alternative power source (e.g., a rechargeable battery, a universal power supply, or other energy supply) that is capable of providing energy to one or more subcomponents when no energy is being drawn from an energy generation station (e.g., after the energy draw from the energy generation system has been terminated). The operation and energy management methods of the energy offloading systems are further described below.

As illustrated, a first energy offloading system 112 is electrically connected to the coal power plant 104. The first energy offloading system 112 may be in direct electric communication with the coal power plant 104. That is, all energy delivered by the coal power plant 104 to the first energy offloading system 112 may be known. In such an instance, any energy drawn from the first electrical connection 122 must come from coal power plant 104. In this way, the coal power plant 104 can direct a certain amount of energy to the first energy offloading system 112. Further, the coal power plant 104 may terminate transmission of electrical energy over the first electrical connection 122.

In an example, the coal power plant 104 uses the first energy offloading system 112 as a deposit for excess energy it generates. For example, the coal power plant 122 may provide energy to an electrical grid 109. The electrical grid 109 may be serviced by other energy generation systems. The demand of users of the grid (e.g., residential houses, commercially businesses, etc.) may be low enough that the energy produced by the coal power plant 122 is unneeded. In aspects of the technology, the first energy offloading system 112 draws energy from the coal power plant 104. The first energy offloading system 112 may draw energy to allow the coal power plant 104 to operate at a minimum energy generating load. One advantage includes allowing the coal power plant 104 to avoid costly start-up and shutdown process. Rather, the first energy offloading system 112 receives the excess energy.

FIG. 1 also illustrates a nuclear power plant 106 in direct electric communication with a second energy offloading system 114 using a second electrical connection 124. Similar to the coal power plant 104, the nuclear power plant 106 may use the second energy offloading system 114 to allow the nuclear power plant 106 to maintain a minimum load level, even when there is insufficient demand from the grid to continue operations. As illustrated, the second energy offloading system 114 is also coupled to the grid 109. This may allow the second energy offloading system 114 to continue to draw power after the energy coming from the nuclear power plant 106 has been terminated. Other alternative sources of energy are further described herein.

Additionally illustrated is a wind energy generation farm 106. The wind energy generation farm 106 may similarly send electrical energy to a third energy offloading system 116 using the third electrical connection 126. One skilled in the art will appreciate that the function of the second energy offloading system 116 may be the same as or similar to those described herein. The third energy offloading system 116 may be used to allow the wind energy generation farm 106 to deliver excess energy to the third energy offloading system 116 during high winds and terminate delivery of energy during periods of relatively low winds. This same advantage may be realized by the biological energy recovery system 108 connected to a fourth energy offloading system 118 using a fourth electrical connection 128, even though the biological energy recovery system may be in electric communication with the grid 109.

Additionally illustrated is a fifth energy offloading system 120 coupled to a natural gas well 110. The fifth energy offloading system 120 is in direct electric communication with the natural gas well 110 through a fifth electrical connection 130. In aspects of the technology, the natural gas well converts operational energy (e.g., using a turbine) into electrical energy and delivers the electrical energy to the fight energy offloading system 120 through the fifth electrical connection 130. This may allow the fifth energy offloading system 120 to make use of energy that would otherwise go unused.

It will be appreciated that the first electrical connection 122, the second electrical connection 124, the third electrical connection 126, the fourth electrical connection 128, and the fifth electrical connection 130 may be an electrical wire(s) or cable(s) capable of delivering electrical energy to the first energy offloading system 112, the second energy offloading system 114, the third energy offloading system 116, the fourth energy offloading system 118, and the fifth energy offloading system 120. Each electrical connection may have an electrical meter or other device to monitor the amount of electrical energy coming into the respective energy offloading system.

Figure 2A:
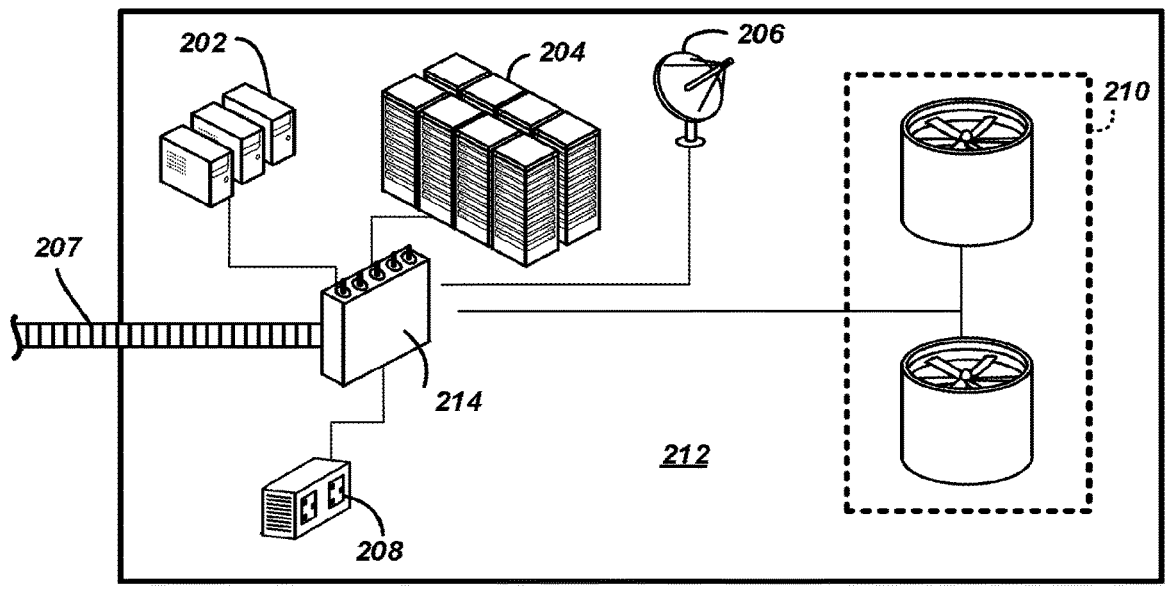
FIGS. 2A and 2B illustrate an example system capable of dynamically receiving energy from an energy generation system
Figure 2B:
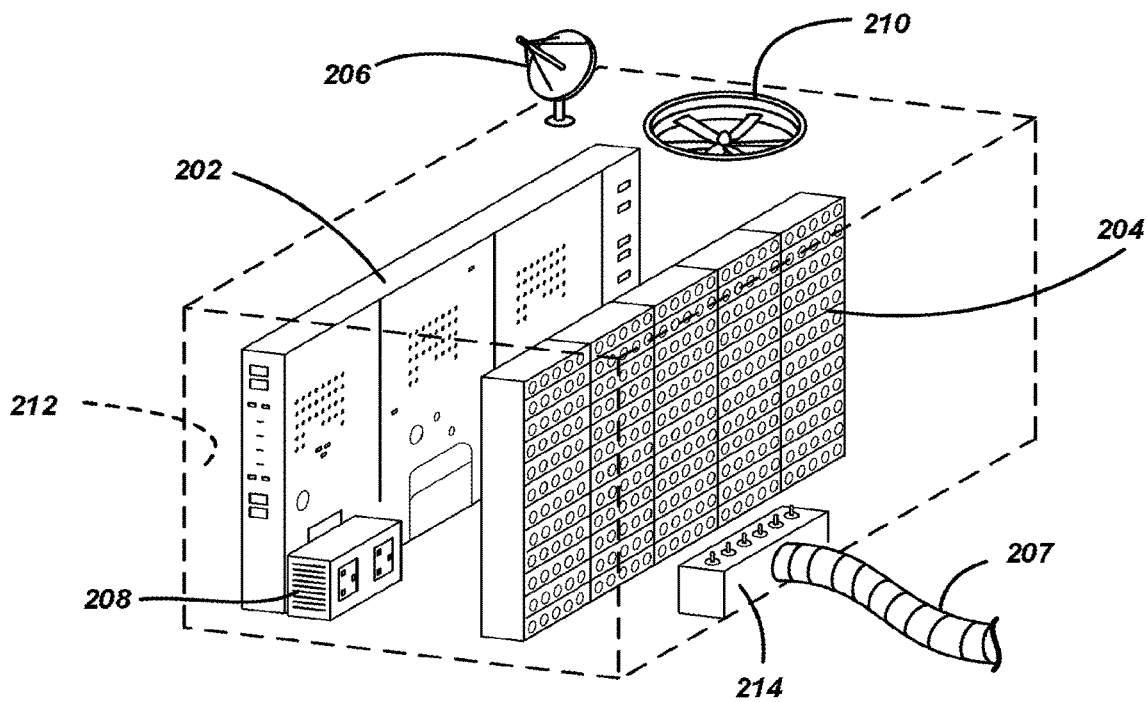

FIGS. 2A and 2B illustrate an example system 200 capable of dynamically receiving energy from an energy generation system, which system may be one or more of the energy offloading systems described above with reference to FIG. 1. As illustrated, FIG. 2 includes computing units 202 in electronic communication with data racks 204, and one or more communication devices 206. Each of the computing units 202, data racks 204, and one or more communications devices 206 are in electric communication with an alternative energy supply 208 via an energy management device. Additionally, each of the computing units 202, data racks 204, and one or more communications devices 206 are in electric communication with an electrical connection 207 (which provides direct electrical communication with an energy generation system) via the energy management device 214. Additionally electrically coupled to the alternative energy supply 216 and the electrical connection 207 through the energy management device 214 is one or more cooling units 210.

The computing units 202 may be one or more of a central processing unit ("CPU"), application-specific integrated circuit ("ASIC"), field-programmable gate array ("FPGA"), and/or a graphics processing unit ("GPU") together with associated hardware including a computer chassis, motherboard, RAM, local communication devices (e.g., modems) and local storage, controller/PCB hardware, and/or local processing cooling units, such as fans. The computing units 202 may serve the function of performing high load calculations, such as data mining, graphic rendering, machine learning, cryptocurrency mining, blockchain validation, distributed ledger processing, and/or distributed computation. The results of these computations may be sent to an outside computer via a network through the use of data racks 204 and communications devices 206.

The data racks 204 may be a rack mounted server dedicated to serving the communications needs of the system 200. One or more data racks 204 may facilitate communication with a network, such as the Internet through the communications devices 206.

The communications devices 206 may be a satellite, an antenna or antenna array, a cable or telephone line, fiber optics, and associated devices capable of communicating information. The communications devices 206 serve to communicate information, including information related to the calculations performed by the computing units 202 and the data racks 204.

The system 200 may draw energy from an electrical connection 207. The electrical connection 207 may be in direct electrical communication with an energy generation system, such as the energy generation systems described above with reference to FIG. 1. The electrical energy received from the connection 207 may power one or more of the computing units 202, the data racks 204, the communication devices 206, and or the cooling units 210.

The alternative energy supply 208 may be a universal power supply that provides emergency back-up power to a load. Additionally or alternatively, the alternative energy supply 208 may be power from another power source, such as another energy generation system or an electrical grid. The alternative energy supply allows 208, in aspects of the technology, for the system 200 to maintain power to one or more of the computing units 202, the data racks 204, the communication devices 206, and/or the cooling units 210 in the event of termination of energy received from the electrical connection 207.

The one or more cooling units 210 may be fans, air conditioning, liquid cooling, or other devices or systems capable of maintaining a temperature of an environment 212. In aspects of the technology, the environment 212 is a closed environment, and the one or more cooling units 210 are dedicated to cooling (or managing) an environment 212.

An energy management device 214 may be electrically coupled to each of the computing units 202, the data racks 204, the communication devices 206, and/or the cooling units 210. In aspects of the technology, the energy management device 214 may be an electrically controlled switch or series of switches capable of receiving instructions and terminating electrical communication between the alternative energy supply 208 and/or the electrical connection 207 and the computing units 202, the data racks 204, the communication devices 206, and/or the cooling units 210.

In an aspect of the technology, each of the devices described with reference to system 200 may be disposed within a portable container. That is, each of the computing units 202, the data racks 204, the communication devices 206, the energy management device 214, and/or the cooling units 210 may be physically located within a container having at least one wall a ceiling and a floor to form at least one internal environment 212. The electrical connection 207 may run from the portable container to the energy generation system. The portable container may then be located proximate to an energy generation system to allow easy direct electric coupling with the system 200 via the electrical connection.

Figure 3:
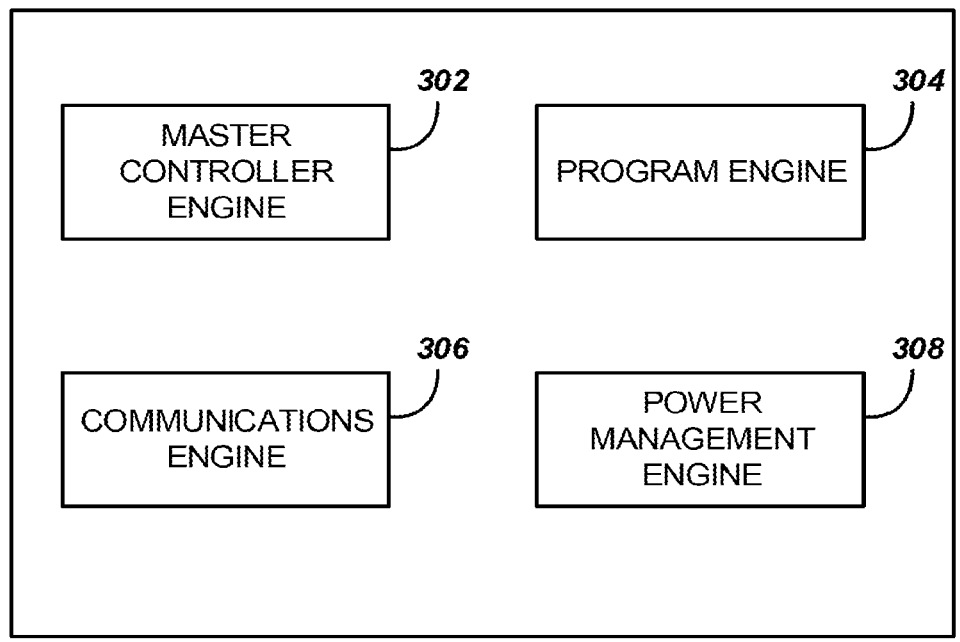
FIG. 3 is an example computer environment capable of managing variable energy from an energy generation system.

FIG. 3 is an example computer environment 300 capable of managing variable energy from an energy generation system. The computer environment is, in examples, instantiated in one or more computers of an energy offloading system such as those described in FIGS. 1 and 2 above. Additionally, alternatively, the computer environment may be instantiated in one or more computers in electronic communication with an energy offloading system.

As illustrated in FIG. 3, a master controller engine 302, a program engine 304, a communications engine 306, and a power management engine 308 are all in electronic communication. The master controller engine 302 serves to manage energy requirements of the various devices of an energy offloading system in the event of termination of electrical energy from an energy generation system. In particular, the master controller engine 302 receives information as to the status of the energy being received from an energy generation system. This status may include whether energy is being currently received, the time at which energy will be terminated, the time at which energy will be restored, and/or other information related to energy drawn from an energy generation station. This information may be received from the energy generation station through the communications engine 306, or may be determined through device checks (e.g., an energy meter monitoring an electrical connection, which identifies that the energy from the energy generation station has been terminated).

The master controller engine 302 also receives, in aspects of the technology, the status of a program from the program engine 304. The master controller engine may receive information from the program engine 304 indicating which CPUs, ASICs, FPGAs, and/or GPUs are currently operating, the status of the operation (e.g., a percentage complete), or other information useful in determining whether to maintain power to the CPUs, ASICs, FPGAs, and/or GPUs and associated hardware. Based on receiving the status of the program, the master controller engine determines whether information related to the program should be stored. After this determination, the master controller engine 302 sends instructions to the program engine 304 regarding whether to complete processing of currently running programs and/or what, if any, state information to store.

The master controller engine 302 also directs the power management engine 308 to terminate or maintain power to the CPUs, ASICs, FPGAs, and/or GPUs and (computing systems). In aspects of the technology, this may be based on the timing of the impending shutdown and the determination of whether the state information of the particular computing system should be stored, the available energy (if any) in an alternative power source, and the like. In aspects, the master controller sends control instructions to terminate or maintain power for the various computers to the power management system 308.

Similarly, based on the timing of the impending shutdown and the status of the computer programs, the master controller engine 302 sends instructions to terminate or maintain power to the communications devices to the power management system 308. The master engine 302 may determine to maintain power to the communications device after receiving information from the communications devices regarding that status of a transmission of data. For example, where a server is near completion of delivery of a message, and where the message issuing the communication devices, the master controller engine 302 may request the power management system 308 maintain power to the communication devices.

The program engine 304 monitors the status of the various computing systems (CPUs, ASICs, FPGAs, and/or GPUs) of an energy offloading system, such as the energy offloading systems described above. The program engine 304 monitors reports the status of the computations of the various computing systems to the master controller engine. This may be accomplished by sending such status on a specific interval, after an event, or in response to a request.

The program engine 304 also receives instructions to store state information. This information may be received by the master controller engine 302. The program engine 304 may in turn instructs specific computers to shut down (after storing the state information, as necessary).

The communications engine 306 monitors the status of data being sent by the various servers and/or data racks of an energy offloading system. For example, the communications engine 306 may monitor what information is currently in one or more data racks and communicate that to the master control engine 302. The communications engine may also receive requests to terminate transmission (e.g., a transmission interrupt) or continue to send information.

The power management engine 308 controls power to one or more devices in an energy offloading system. This may be accomplished by sending instructions to an energy management device described above (e.g., an electronically controlled switch). In aspects of the technology, the power management engine 308 receives instructions to terminate power of one or more processing units, communications devices, data racks and/or a cooling unit of an energy offloading system. Additionally, the power management engine 308 receives instructions to change power from an electrical connection (e.g., an energy generating system) to an alternative energy source for one or more processing units, communications units, data racks and/or a cooling unit.

Figure 4:
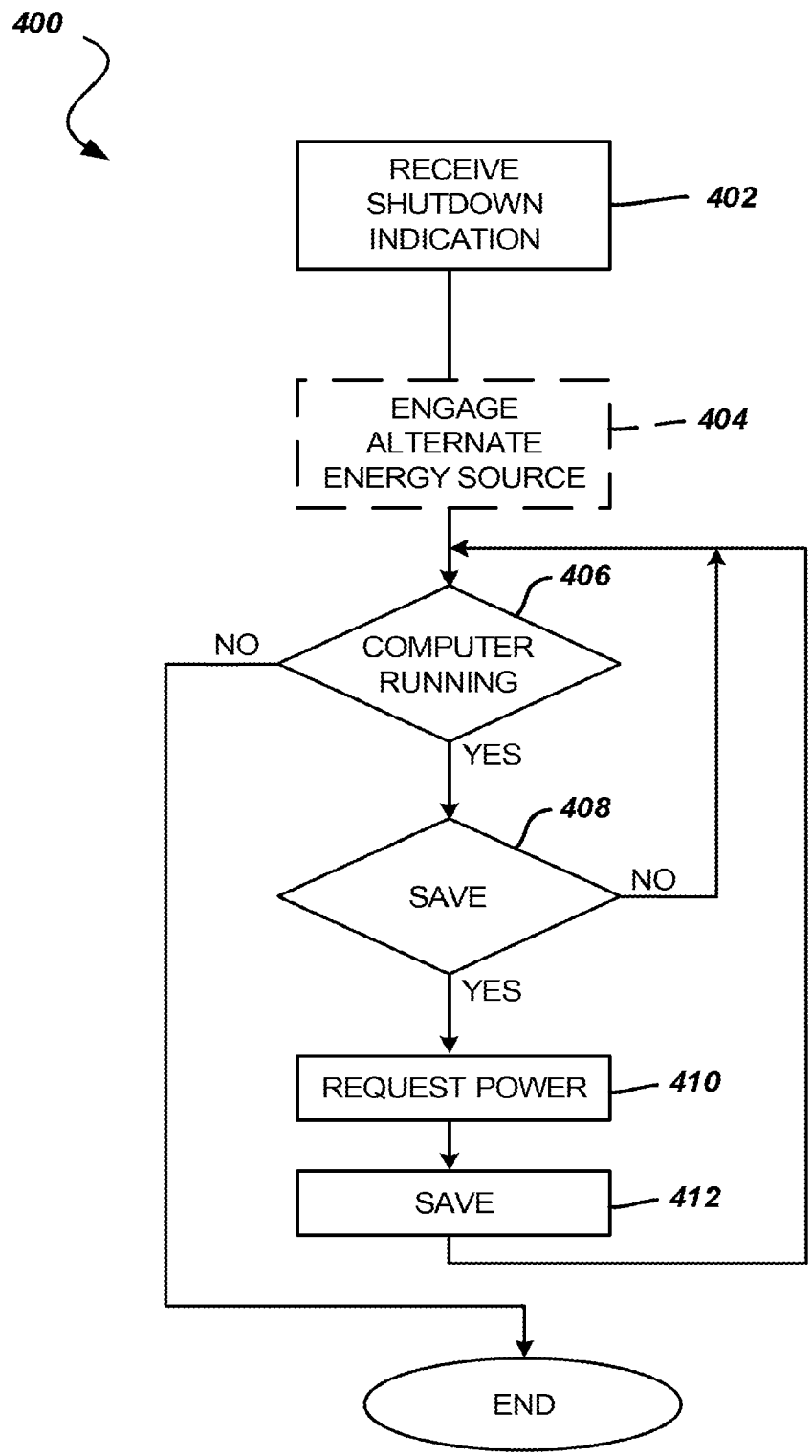
FIG. 4 is a method for determining to power down computational devices in an energy offloading system.

FIG. 4 is a method 400 for determining to power down one or more computational devices in an energy of loading system. Method 400 begins with receive indication of an energy shut off or curtailment operation 402. The indication may be the termination or reduction of the energy from an electrical connection. Additionally/alternatively, the indication may be a message communicated electronically and delivered to a communication device of the energy offloading system indicating that the energy delivered to the energy offloading system will be terminated or curtailed at some point in the future. The message may include a termination alert. The termination alert may include a time stamp (e.g., a date and time) that the energy generation system will no longer deliver energy to the energy offloading system. In aspects of the technology, the termination alert may also include a time at which the energy generation system will restart transmission of energy.

Method 400 then optionally proceeds to engage alternate energy source operation 404. At operation 404, an alternate energy source may be engaged to power various devices of an energy offloading system described above (e.g., CPUs, ASICs, FPGAs, and/or GPUs, data racks, cooling units) etc. In aspects of the technology, the alternative energy source is used to power one or more of the devices of the energy offloading system unless and until it is determined to power the devices down (i.e., it is an automatic change from drawing energy from an energy generation station to an alternate power source).

Method 400 then proceeds to computational device running determination 406. At operation 406, it is determined whether a computational device (e.g., a CPU, ASIC, FPGA, and/or GPUs) is currently running. In aspects of the technology, where a computation device is running, the particular status of the computation may be determined, as is appropriate or desired for the particular program.

Where an additional computational device is running, the method 400 then proceeds to save computational device information determination 408. At operation 408, it is determined whether to save the computational device information. This determination may be determined based on the attribute of the computation (which may be assigned by an administrator (e.g., a computer system having administrative control of the system, which may be/have a user interface to allow one or more users to control at least part of the system), the percent completion of the computation, etc., as further provided in Table 1 below:

| Rule | Example |
| --- | --- |
| Type of Computation | If Graphic Rendering then Save; If cryptocurrency block hashing algorithm, then do not save; |
| Type of Device | If CPU data, then save. If GPU data, then do not save. |
| Assigned Attribute | If tagged as highly important, then save. If tagged as medium importance, then do not save. |
| Level of Completion | If > 75% complete, then save. If > 2 hours processing time, then save. |

Where it is determined that the computational device's state requires saving, the method then optionally proceeds to request power to computational device operation 410. This may occur where the indication of termination indicates that power to the energy offloading system has been terminated. Alternatively, the indication of termination may also indicate that the power to the energy offloading system will be terminated prior to the likely completion of the calculation. The request may be sent to a power management engine and/or a master controller engine as described above. In aspects where the alternate power source has been previously engaged, operation 408 may include requesting to maintain power to the computational device at operation 408.

After request power to computational device operation 410, the method then proceeds to save computational state information operation 412. In this operation, state information related to the program running on the computational device is saved. This may be saved to any suitable storage device as further described below.

After request power to computational state operation 412, the method then proceeds to power down computational device operation 414. In operation 412, the device is powered down.

Returning to determination 408, where it is determined that the computational device information does not need to be saved, the determination proceeds directly to power down computational device operation 414.

After the operation 414, method 400 returns to determination 406. If there are no additional computational devices running, the method 400 ends.

Figure 5:
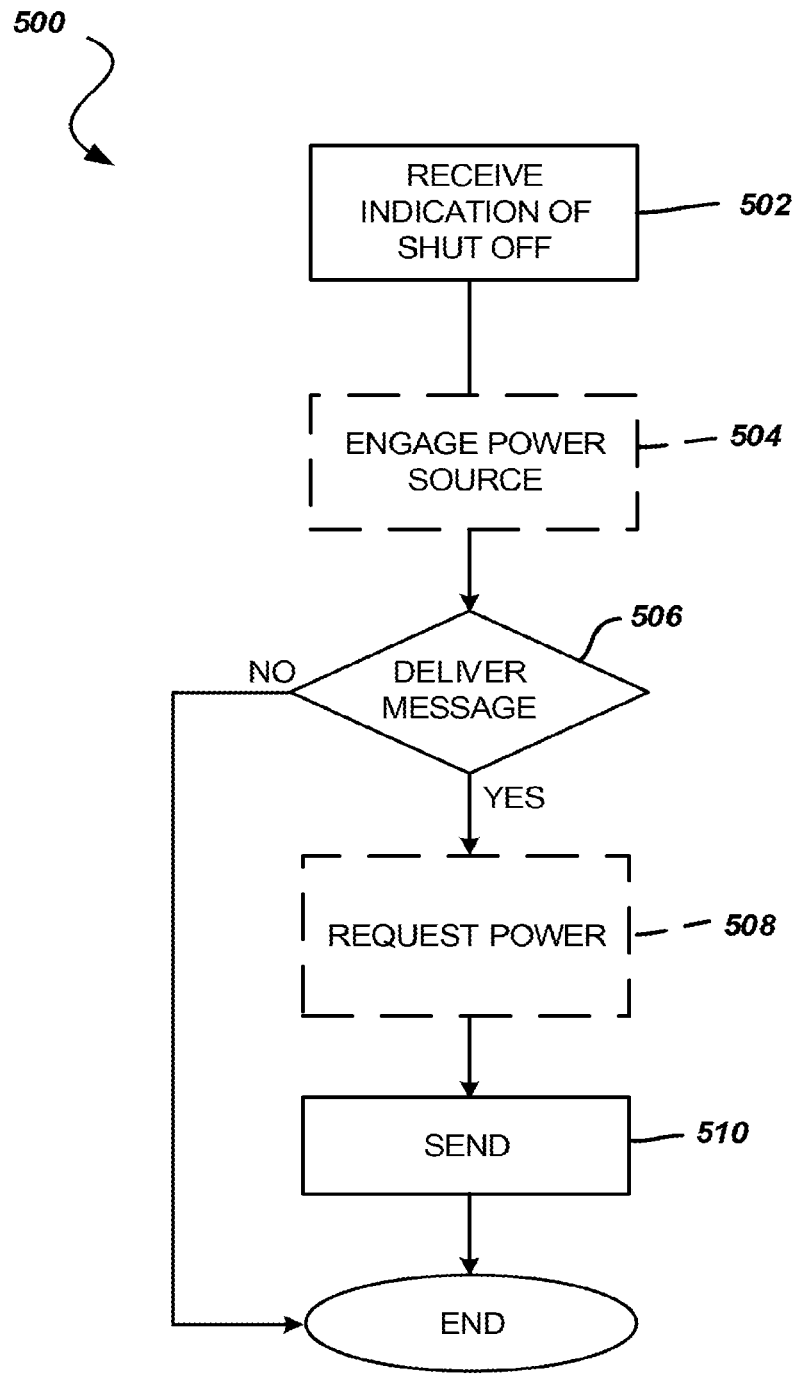
FIG. 5 is a method for determining to power down communication devices in an energy offloading system.

FIG. 5 is a method 500 for determining to power down communication devices in an energy of loading system. Method 500 begins with receive indication of an energy shut off operation 502. The indication may be the termination of the energy from an electrical connection. Additionally/alternatively, the indication may be a message communicated electronically and delivered to a communication device of the energy offloading system. The message may include a termination alert. The termination alert may include a time stamp (e.g., a date and time) that the energy generation system will no longer deliver energy to the energy offloading system. In aspects of the technology, the termination alert may also include a time at which the energy generation system will restart transmission of energy.

Method 500 then optionally proceeds to engage alternate power source operation 504. At operation 504, an alternate energy source may be engaged to power various devices of an energy offloading system described above (e.g., CPUs, ASICs, FPGAs, and/or GPUs, data racks, and or cooling units) etc. In aspects of the technology, the alternative energy source is used to power the devices of the energy offloading system unless and until it is determined to power the devices down (i.e., it is an automatic change from drawing energy from an energy generation station to an alternate power source).

Method 500 then proceeds to deliver message determination 506. In operation 506, it is determined whether any messages are in the process of being sent and whether the delivery of these messages should be completed. Such determination may be determined by an attribute of the content of the message, such as importance (which may be set by an administrator), the size of the message, the time required to send the message, and/or the time that the energy termination will occur.

Where it is determined that message needs to be delivered, the method then optionally proceeds to request power to communication device operation 508. This may occur where the indication of termination indicates that power to the energy offloading system has been terminated. Alternatively, the indication of termination may also indicate that the power to the energy offloading system will be terminated prior to the likely completion of the message deliver. The request may be sent to a power management engine and/or a master controller engine as described above. In aspects where the alternate power source has been previously engaged, operation 508 may include requesting to maintain power to the communication device/data racks at operation 508.

After request power to communication device operation 508, the method then proceeds to send message operation 510. In operation 510, the message is sent. This may be accomplished using one or more of the communication devices described herein.

After the operation 508, method 500 returns to determination 506. If there are no additional message to be sent, the method 500 ends.

Figure 6:
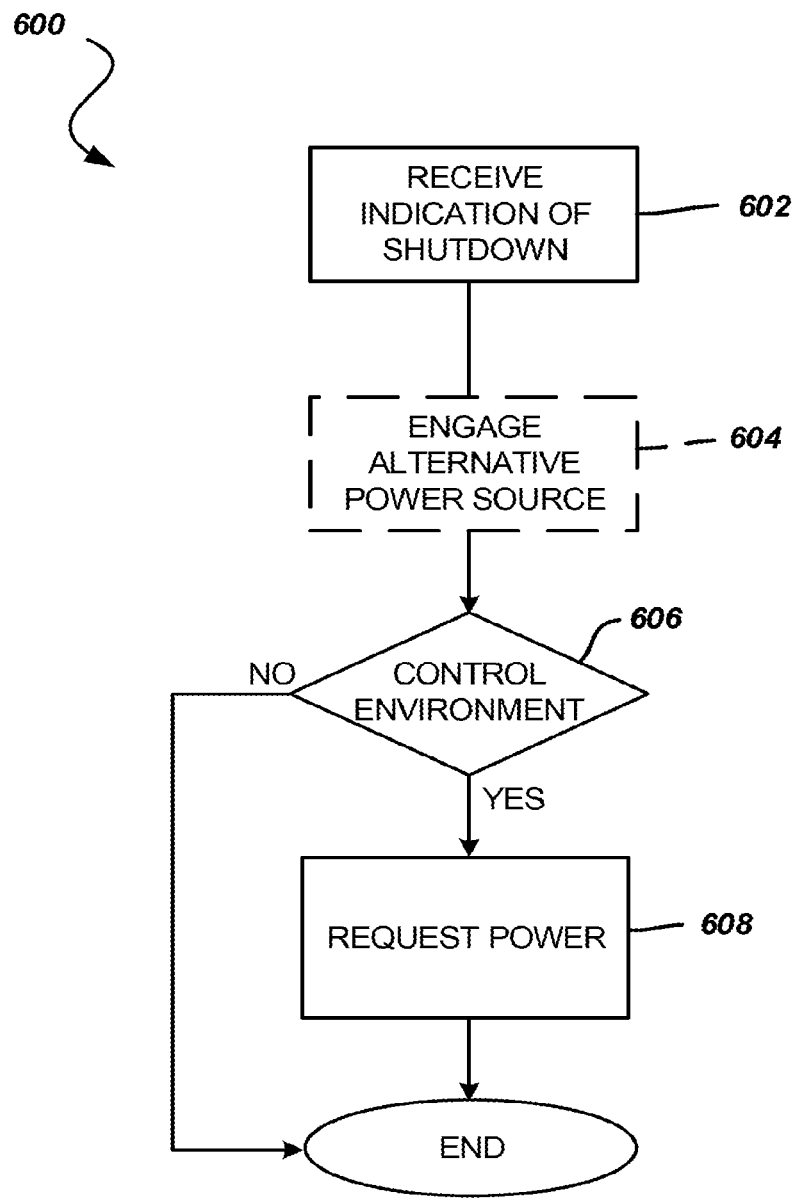
FIG. 6 is a method for determining whether to maintain power to a cooling device.

FIG. 6 is a method 600 for determining whether to maintain power to a cooling device. Method 600 begins with receive indication of an energy shut off operation 602. The indication may be the termination of the energy from an electrical connection. Additionally/alternatively, the indication may be a message communicated electronically and delivered to a communication device of the energy offloading system. The message may include a termination alert. The termination alert may include a time stamp (e.g., a date and time) at which the energy generation system will no longer deliver energy to the energy offloading system. In aspects of the technology, the termination alert may also include a time at which the energy generation system will restart transmission of energy.

Method 600 then optionally proceeds to engage alternate power source operation 604. At operation 604, an alternate energy source may be engaged to power various device of an energy offloading system described above (e.g., CPUs, ASICs, FPGAs, and/or GPUs, data racks, cooling units, etc.). In aspects of the technology, the alternative energy source is used to power the devices of the energy offloading system unless and until it is determined to power the devices down (i.e., it is an automatic change from drawing energy from an energy generation station to an alternate power source).

Method 600 then proceeds to environment control determination 606. At operation 606, it is determined whether the environment of an energy offloading system is to be controlled. This may be determined based on the temperature of the environment, the number of devices using power, the temperature of the outside environment, the forecasted whether, etc.

Where it is determined that cooling is needed, the method then proceeds to request power to cooling devices operation 608. This may occur where the indication of termination indicates that power to the energy offloading system has been terminated. The request may be sent to a power management engine and/or a master controller engine as described above. In aspects where the alternate power source has been previously engaged, operation 608 may include requesting to maintain power to the communication device operation 608.

After the cool operation 608, the method 600 then ends. If there are no cooling requirements at operation 606, the method 600 ends.

Figure 7:
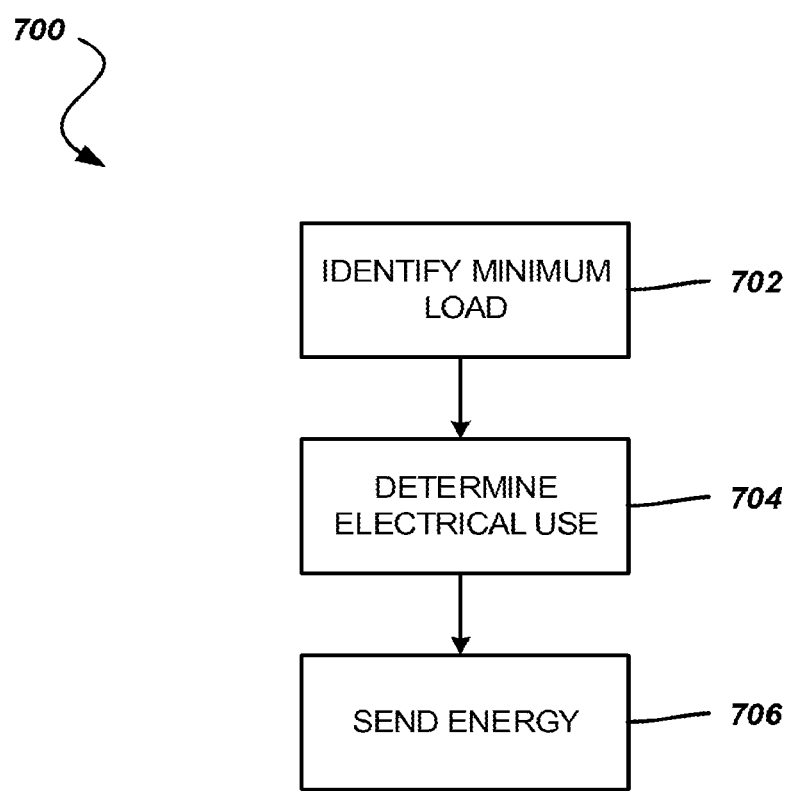
FIG. 7 is a block diagram illustrating physical components (e.g., hardware) of a computing device with which aspects of the disclosure may be practiced.

FIG. 7 is a method 700 of managing the electrical demand of an energy generating system comprising. Method 700 begins with identifying a minimum load operation 702. In operation 702, the minimum load is determined to operate an energy generating system. This may include identifying a minimum load for a coal power plant to run a turbine, for example. In alternative embodiments, a natural gas extraction site may determine an amount of energy required to run an electric generator.

Method 700 then proceeds to determine current electrical need operation 704. At operation 704, it is determined whether there is a need to divert energy into an energy offloading system. This determination may include determining that the energy generation system is generating energy that may otherwise go unused or is unneeded. For example, it may be determined that demand from an electrical grid is insufficient to receive all energy currently generated (or that will be generated) by an energy generating system. Additionally, or alternatively, an energy generating system may be a natural gas system, and it may be determined that the natural gas system is generating excess unused energy from an over pressurized line. This energy may then be diverted to a generator (in addition to or instead of running a flare). In some aspects, a difference is determined between the amount of energy generated and the amount of energy used by a load other than the energy offloading system (e.g., the electrical grid).

The method 700 then proceeds to send energy to an energy offloading system operation 706. At operation 706, energy may be sent over an electrical connection. The energy may be sent at a variety of voltages (e.g., 120, 480, 380, 400, 600) and be sent at a variety of frequencies using any number of wires.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
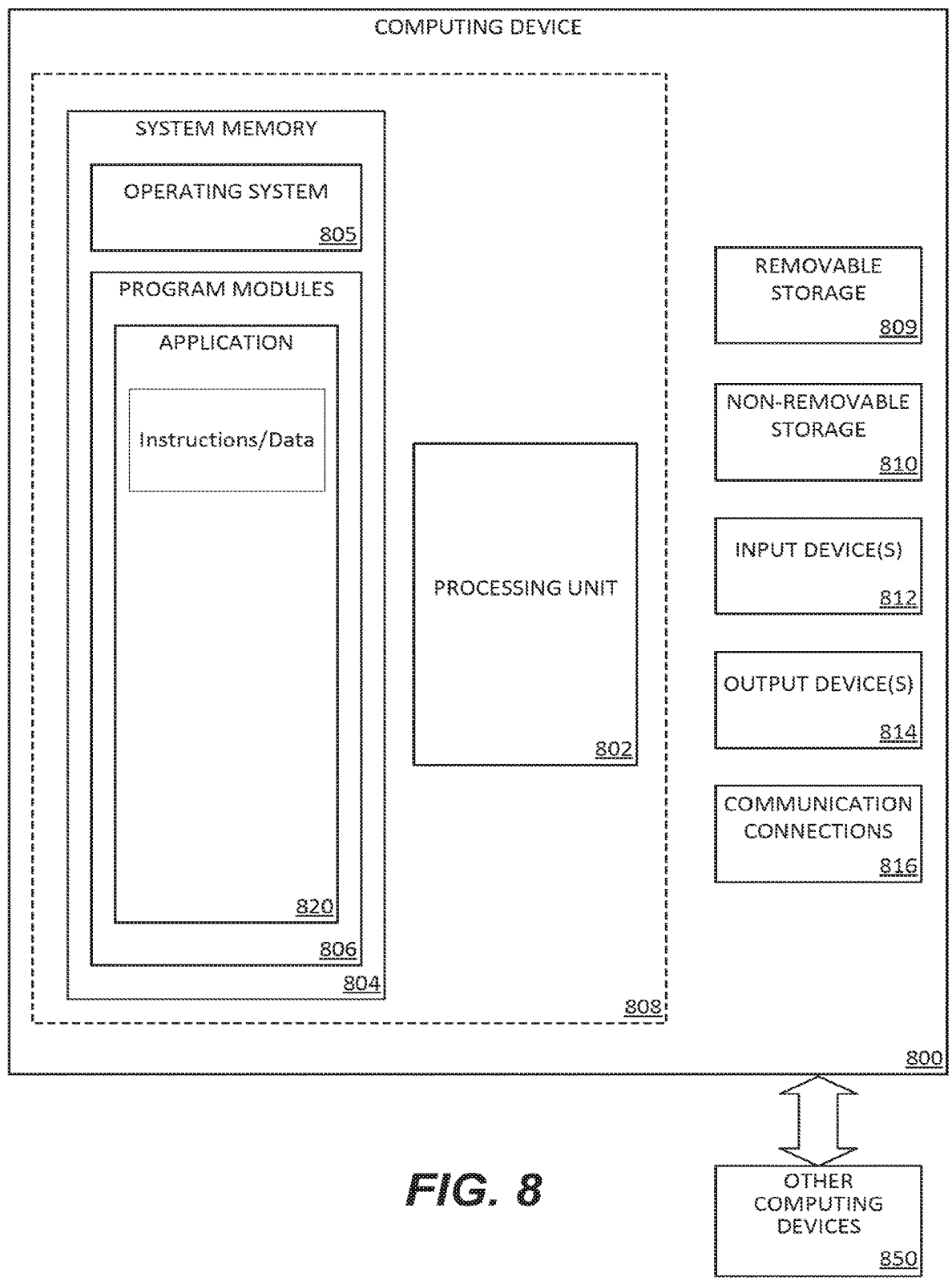
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running software application 820, such as one or more components supported by the systems described herein. As an example, system memory 804 may store information related to the management of energy in an energy offloading system. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
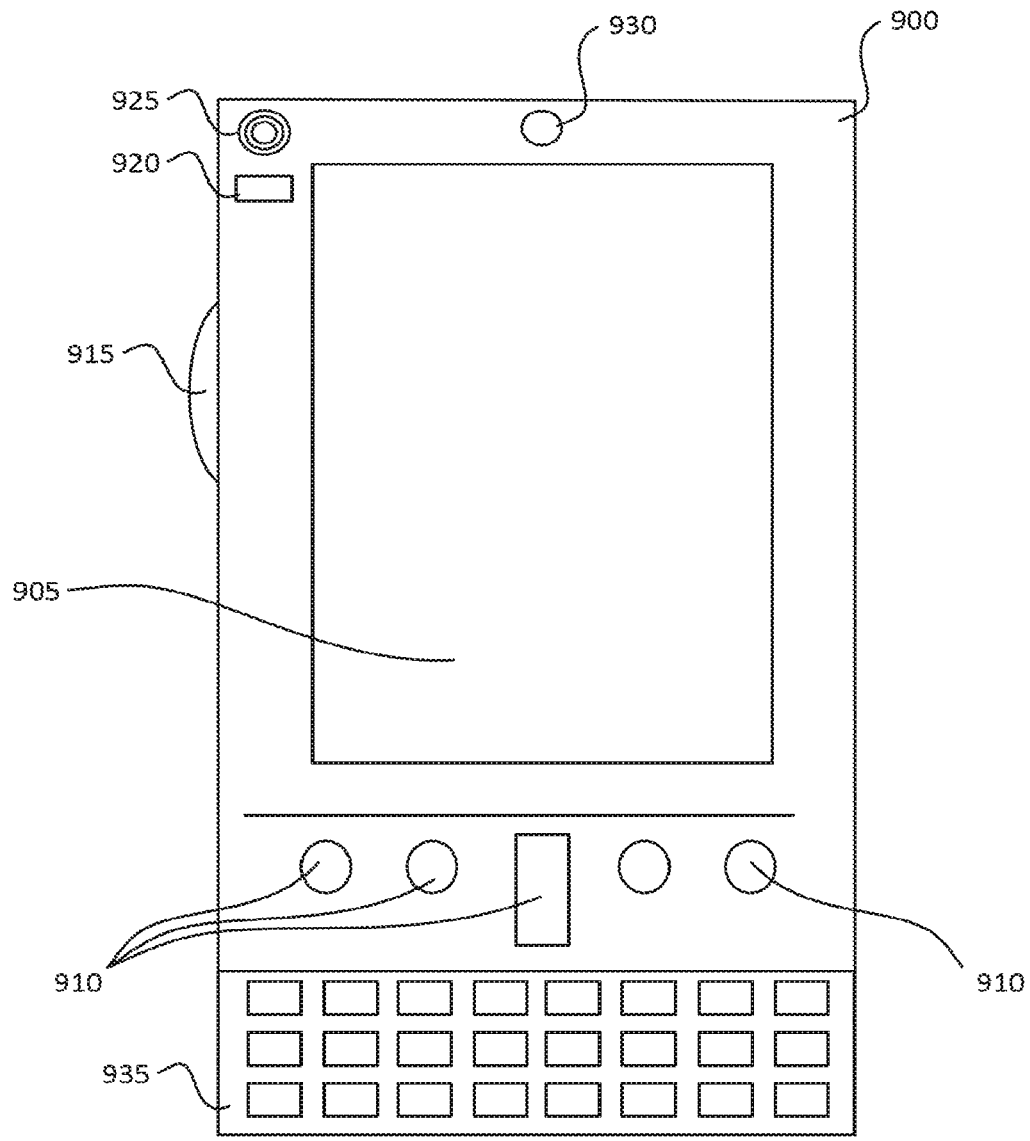
FIGS. 9A and 9B illustrate a mobile computing device, for example, a mobile telephone, a smart phone, wearable computer (such as a smart watch), a tablet computer, a laptop computer, and the like, with which embodiments of the disclosure may be practiced.
Figure 9B:
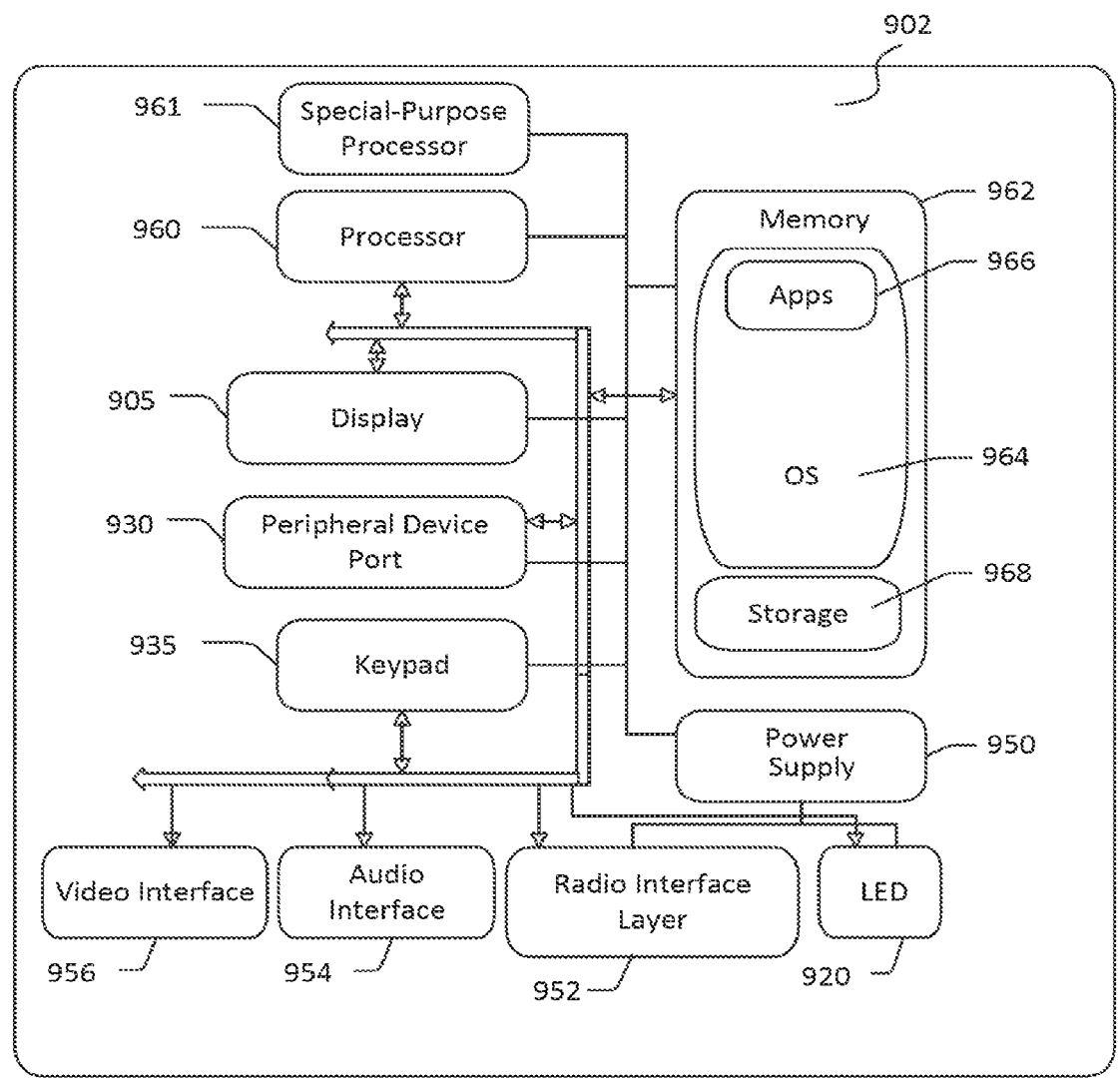

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 825 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 1072 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor(s) (e.g., processor 960 and/or special-purpose processor 961) and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
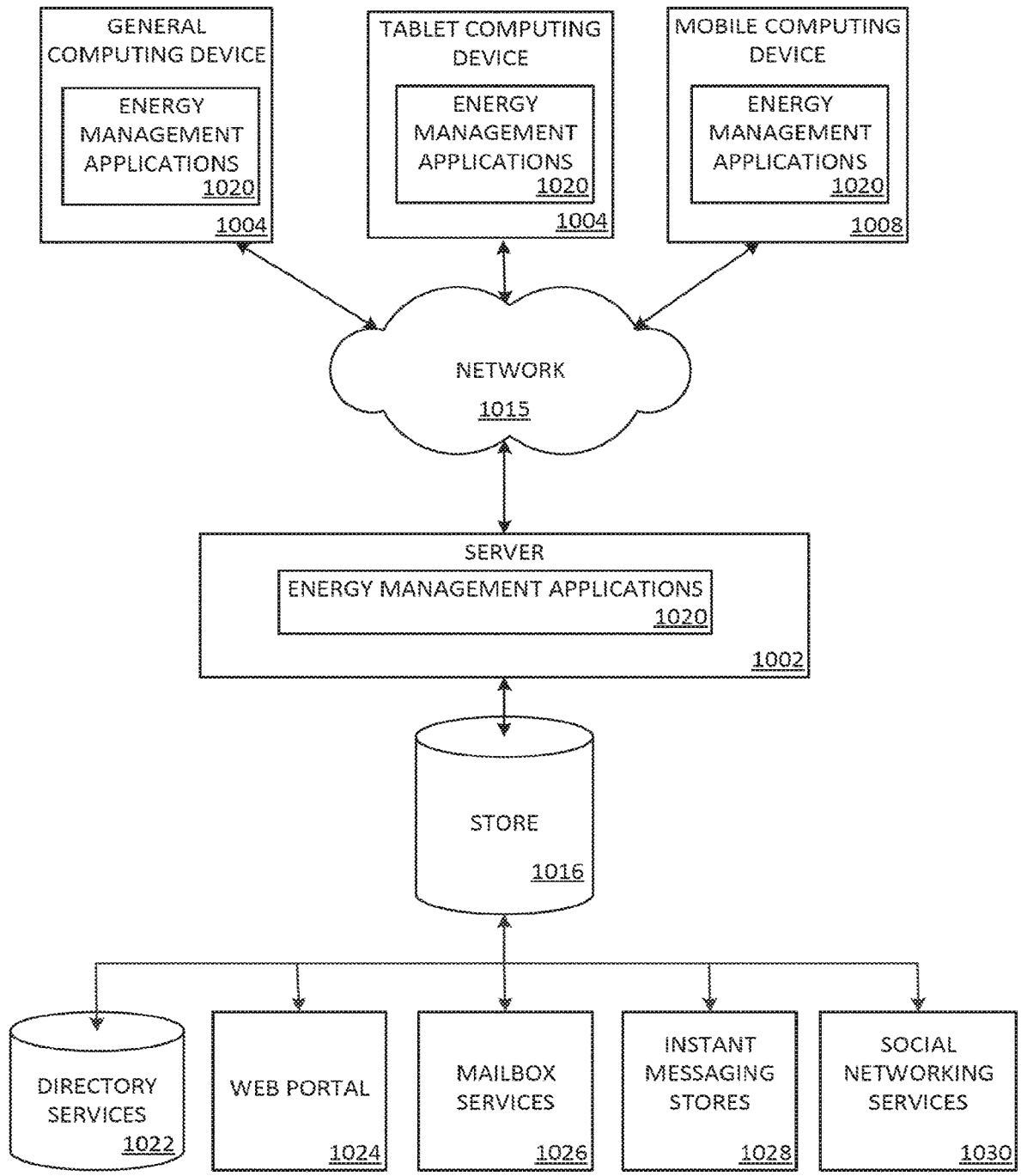
FIG. 10 is a simplified block diagram of a distributed computing system in which aspects of the present disclosure may be practiced.

FIG. 10 illustrates one aspect of the architecture of a system for managing energy using computer systems of an energy offloading system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. An energy management applications 1020 (e.g., the methods of FIGS. 4-7 described above) may be employed by a client that communicates with server device 1002, and/or the energy management applications 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of operating an energy offloading system that operates off of excess energy from an energy generation station, the energy generation station adapted to provide energy independently to both an electric grid serving a plurality of paying customers and the energy offloading system, the method comprising:
    operating the energy offloading system using excess energy obtained directly from the energy generation station, wherein the energy offloading system includes a plurality of computational devices;
    receiving, by the energy offloading system, an energy termination alert including a time in the future that the energy generation station will cease to provide excess energy to the energy offloading system in order to provide the excess energy to the electric grid;
    in response to receiving the energy termination alert, identifying an active subset of computational devices of the plurality of computational devices, wherein the active subset of computational devices being those computational devices of the plurality that are currently active and wherein each computational device of the active subset of computational devices has an associated computational state;
    identifying the associated computational state of each computational device of the active subset of computational devices;
    based on an evaluation of the associated computational state of each computational device of the active subset of computational devices, saving at least some computational information of at least one of the computational devices in the active subset of computational devices; and
    after saving, powering down the active subset of computational devices.

2. The method of claim 1, wherein operating the energy offloading system using excess power further comprises:
    monitoring the amount of excess power obtained directly from the energy generation station making active;
    based on the amount of excess power obtained directly from the energy generation station, determining which of the plurality of computational devices to operate and be the active subset of computational devices.

3. The method of claim 1, wherein each of the active subset of computational devices is processing a program related to at least one of data mining, graphic rendering, machine learning, cryptocurrency mining, blockchain validation, distributed ledger processing, or distributed computation.

4. The method of claim 3, wherein saving at least some computational information of at least one of the computational devices in the active subset of computational devices further comprises:
    saving computational information related to the state of the program after receiving the energy termination alert.

5. The method of claim 1, wherein the powering down the active subset of computational devices is performed after saving but before the time in the future identified by the energy termination alert.

6. The method of claim 1, wherein the energy offloading system includes a buffer storing data from plurality of computational devices and a network communication device and the method further comprises:
    transmitting the data in the buffer; and
    after transmitting the data, powering down the network communication device.

7. The method of claim 1, wherein the energy offloading system includes at least one cooling unit and the method further comprises:
    powering the at least one cooling unit with excess energy from the energy generation station;
    in response to receiving the energy termination alert, identifying an alternative power source selected from a battery or the electric grid; and
    powering the at least one cooling unit with energy from the alternative power source for a predetermined period of time after termination of excess energy to the energy offloading system while the plurality of computational devices is without power.

8. The method of claim 1, wherein identifying the associated computational state of each computational device of the active subset of computational devices further comprises:
    identifying one of a) a type of computation being performed by the computational device, b) a processing unit type of the computational device, c) an assigned attribute of the computational device, or d) a level of completion of a process being run on the computational device.

9. The method of claim 8, wherein identifying the associated computational state of each computational device of the active subset of computational devices further comprises:
    identifying each computational device of the active subset of computational devices that has a level of completion of greater than 75% complete.

10. The method of claim 8, wherein identifying the associated computational state of each computational device of the active subset of computational devices further comprises:
    identifying each computational device of the active subset of computational devices that has a level of completion of greater than 2 hours of processing.

11. The method of claim 8, wherein identifying the associated computational state of each computational device of the active subset of computational devices further comprises:

identifying each computational device of the active subset of computational devices that is performing graphic rendering.

12. The method of claim 1 further comprising:

determining a time of likely completion of saving at least some computational information of at least one of the computational devices in the active subset of computational devices; and comparing the time of likely completion to the time in the energy termination alert that the energy generation station will cease to provide energy to the energy offloading system.

13. The method of claim 12 further comprising:

if the comparison indicates that the saving will not be completed by the time that the energy generation station will cease to provide energy to the energy offloading system, identifying an alternative power source selected from a battery or the electric grid;

powering the at least one of the computational devices in the active subset of computational devices with energy from the alternative power source; and after completion of the saving, powering down the at least one of the computational devices.

14. The method of claim 1 further comprising:

receiving, by the energy offloading system, an energy restart alert including a time in the future that the energy generation station will begin to provide energy to the energy offloading system; and upon resumption of excess energy obtained directly from an energy generation station via a transmission line independent of the electrical grid serving a plurality of paying customers, activating at least one of the active subset of the plurality of computational devices and returning the at least one of the active subset of the plurality of computational devices to its associate computational state using the saved computation information.

* * * * *